(12) United States Patent
Honma et al.

(10) Patent No.: US 9,557,068 B2
(45) Date of Patent: Jan. 31, 2017

(54) HEAT PUMP HOT-WATER SUPPLY SYSTEM

(75) Inventors: Masaya Honma, Osaka (JP); Susumu Kobayasi, Hyogo (JP)

(73) Assignee: PANASONIC INTELLECTUAL PROPERTY MANAGEMENT CO., LTD. (JP)

( * ) Notice: Subject to any disclaimer, the term of this patent is extended or adjusted under 35 U.S.C. 154(b) by 1292 days.

(21) Appl. No.: 13/498,743

(22) PCT Filed: Aug. 30, 2010

(86) PCT No.: PCT/IB2010/002147
§ 371 (c)(1),
(2), (4) Date: Apr. 26, 2012

(87) PCT Pub. No.: WO2011/036525
PCT Pub. Date: Mar. 31, 2011

(65) Prior Publication Data
US 2012/0205456 A1    Aug. 16, 2012

(30) Foreign Application Priority Data
Sep. 28, 2009 (JP) ................. 2009-223349

(51) Int. Cl.
F24D 11/02 (2006.01)
F24D 19/10 (2006.01)
G05D 23/19 (2006.01)

(52) U.S. Cl.
CPC ......... F24D 19/1045 (2013.01); F24D 19/106 (2013.01); F24D 19/1048 (2013.01);
(Continued)

(58) Field of Classification Search
CPC  F24D 19/106; F24D 19/1063; F24D 19/1045; F24D 19/1048; F24D 2200/12; F24D 2200/08; F24D 2200/14; F24D 2200/02; G05D 23/1923
(Continued)

(56) References Cited

U.S. PATENT DOCUMENTS 5,274,571 A * 12/1993 Hesse ................ G05D 23/1923
                                                         700/276
5,700,993 A * 12/1997 Counsell ............ G05D 23/1923
                                                         219/483
(Continued)

FOREIGN PATENT DOCUMENTS

EP    1450110 A2 *  8/2004
JP    6269063 A      3/1987
(Continued)

OTHER PUBLICATIONS

Chapter 4 "Efficiency of Energy Conversion", Aug. 17, 2000, http://www.ems.psu.edu/~radovic/Chapter4.pdf, Retrieved from http://web.archive.org/web/20000801000000*/http://www.ems.psu.edu/~radovic/Chapter4.pdf on Sep. 30, 2015.*
(Continued)

Primary Examiner — Avinash Savani
Assistant Examiner — Deepak Deean
(74) Attorney, Agent, or Firm — Bacon & Thomas, PLLC

(57) ABSTRACT

A heat pump hot-water supply system includes a heat pump hot-water supply device, an electricity storage device, and a control device. The control device determines an operating time zone of the heat pump hot-water supply device based on power conversion efficiency of the electricity storage device, coefficients of performance of the heat pump hot-water supply device of a current day and a next day, and an electricity rate structure of a commercial power system.

5 Claims, 8 Drawing Sheets

(52) U.S. Cl.
CPC ..... *F24D 19/1063* (2013.01); *G05D 23/1923* (2013.01); *F24D 2200/02* (2013.01); *F24D 2200/12* (2013.01); *F24D 2200/14* (2013.01); *F24D 2220/08* (2013.01); *F24H 2240/01* (2013.01); *F24H 2240/09* (2013.01); *Y02B 10/20* (2013.01); *Y02B 10/70* (2013.01)

(58) Field of Classification Search
USPC .......................................................... 237/2 B
See application file for complete search history.

(56) References Cited

U.S. PATENT DOCUMENTS

| | | | | |
|---|---|---|---|---|
| 5,956,462 | A * | 9/1999 | Langford | ............... F24H 9/2021 307/38 |
| 7,130,719 | B2 * | 10/2006 | Ehlers | .................. F24F 11/0012 700/276 |
| 7,274,975 | B2 * | 9/2007 | Miller | .................... G06Q 50/06 700/295 |
| 2005/0142405 | A1 * | 6/2005 | Nagamitsu | ............. G06Q 50/06 705/412 |
| 2006/0168961 | A1 * | 8/2006 | Alekseevich | ........... F03D 9/007 60/641.8 |
| 2008/0000247 | A1 * | 1/2008 | Sinha et al. | ................. 62/238.7 |
| 2010/0019053 | A1 * | 1/2010 | Toland | ...................... F24D 3/02 237/63 |
| 2011/0015802 | A1 * | 1/2011 | Imes | .................. G05D 23/1923 700/300 |

FOREIGN PATENT DOCUMENTS

| | | |
|---|---|---|
| JP | 4200245 A | 7/1992 |
| JP | 2005164124 | 6/2005 |
| JP | 2007139213 A | 6/2007 |
| JP | 200919782 A | 1/2009 |

OTHER PUBLICATIONS

International Search Report from PCT/IB2010/002147.

* cited by examiner

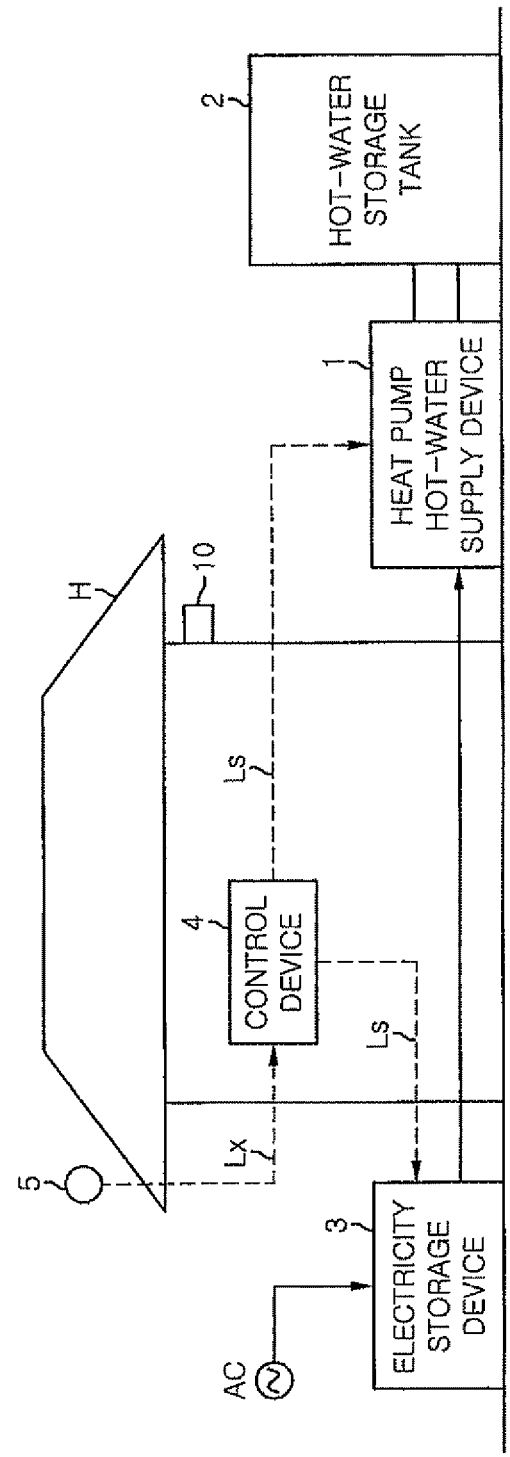

HEAT PUMP HOT-WATER SUPPLY SYSTEM

FIELD OF THE INVENTION

The present invention relates to a heat pump hot-water supply system wherein a heat pump hot-water supply device is operated by using electric energy stored in an electricity storage device.

BACKGROUND OF THE INVENTION

A conventional heat pump hot-water supply system is disclosed in Patent Document 1. The conventional system disclosed in Patent Document 1 includes a heat pump hot-water supply device that is operated with AC power supplied from a commercial power system, and an electricity storage device that converts an AC power of the commercial power system into a DC power to store the DC power and also convert the stored DC power into an AC power to supply the AC power. Accordingly, the AC power of the commercial power system is stored in the electricity storage device in the nighttime in which the electricity rate is lower than the daytime electricity rate, so that power required to operate the heat pump hot-water supply device during the daytime is supplied from the electricity storage device, thereby reducing the operating cost of the heat pump hot-water supply device.

However, a coefficient of performance (COP) of the heat pump hot-water supply device is associated with the outside air temperature, that is, the COP increases in proportion to an increase in the outside air temperature.

Meanwhile, a loss of the electricity storage device occurs due to power conversion upon storing (charging) and supplying (discharging) power in and from the electricity storage device. Taking into consideration the power loss due to the power conversion, when the outside air temperature is very high during the nighttime as in the summer season, the case where hot water obtained by operating the heat pump hot-water supply device during the nighttime is stored into a hot-water storage tank may reduce the operating cost (electricity price), compared to the case where the heat pump hot-water supply device is operated during the daytime using power stored in the electricity storage device.

Also, the power consumption of the heat pump hot-water supply device is comparatively much higher than that of electric devices such as TV sets or washing machines. Thus, in the case of a house provided with a solar light power generation system, when power generated by the solar light power generation system is preferentially consumed by the heat pump hot-water supply device, a deficient amount of power is supplied to the other electric devices. Hence, the amount of power supply from the commercial power system cannot but increase, undesirably increasing the electricity price.

Also, in the case of a house provided with a solar heat-assisted water heater, when the amount of hot water supplied from the solar heat-assisted water heater becomes deficient, the heat pump hot-water supply device should be operated using power supplied from the commercial power system, undesirably increasing the electricity price.

[Patent Document 1] Japanese Patent Application Publication No. 2005-164124

SUMMARY OF THE INVENTION

In view of the above, the present invention provides a heat pump hot-water supply system which is able to reduce the operating cost (electricity price) of a heat pump hot-water supply device.

In accordance with a first embodiment of the present invention, there is provided a heat pump hot-water supply system, including a heat pump hot-water supply device, an electricity storage device, and a control device, wherein the control device determines an operating time zone of the heat pump hot-water supply device based on power conversion efficiency of the electricity storage device, coefficients of performance of the heat pump hot-water supply device of a current day and a next day, and an electricity rate structure of a commercial power system.

Further, the heat pump hot-water supply system may include a hot-water storage tank for storing hot water obtained by operating the heat pump hot-water supply device, wherein the electricity storage device converts AC power supplied from the commercial power system into DC power to store the DC power and also convert the stored DC power into AC power to supply the AC power, and the control device further determines whether the electricity storage device is to be charged or not based on the power conversion efficiency of the electricity storage device, the coefficients of performance of the heat pump hot-water supply device of the current day and the next day, and the electricity rate structure of the commercial power system.

With such configuration, because the electricity rate is differently applied depending on time spans by the electricity rate structure of the commercial power system, the control device may determine the time zone in which the electricity storage device is to be charged/discharged and the time zone in which the heat pump hot-water supply device is to be operated based on the power conversion efficiency of the electricity storage device, and the COP of the heat pump hot-water supply device on the current day and the next day, thereby reducing the operating cost (electricity price) of the heat pump hot-water supply device.

Further, the control device may perform a control operation in such a manner that, in accordance with the electricity rate structure wherein a nighttime electricity rate is lower than a daytime electricity rate, a ratio of coefficients of performance obtained by dividing the coefficient of performance of the heat pump hot-water supply device corresponding to an outside air temperature of the nighttime of the current day by the coefficient of performance of the heat pump hot-water supply device corresponding to an estimated value of an outside air temperature of the daytime of the next day is compared with the power conversion efficiency of the electricity storage device, and thus the heat pump hot-water supply device is operated in the daytime of the next day by using power stored in the electricity storage device in the nighttime of the current day if the ratio of coefficients of performance is less than the power conversion efficiency, whereas the heat pump hot-water supply device is operated in the nighttime of the current day by using power supplied from the commercial power system if the ratio of coefficients of performance is equal to or greater than the power conversion efficiency.

With such configuration, the operating cost of the heat pump hot-water supply device may be further reduced by the system responding to the power conversion efficiency of the electricity storage device, the COP of the heat pump hot-water supply device and the electricity rate structure of the commercial power system.

In accordance with a second embodiment of the present invention, there is provided a heat pump hot-water supply system, including a heat pump hot-water supply device, an electricity storage device, a solar light power generation device for generating power by using solar light, and a control device, wherein the control device compares an estimated amount of power to be generated by the solar light power generation device on a next day with an estimated amount of power required of the heat pump hot-water supply device on the next day, and thus controls operation of the heat pump hot-water supply device by using power supplied from a commercial power system in a nighttime.

Further, in the heat pump hot-water supply system, which may include a hot-water storage tank for storing hot water obtained by operating the heat pump hot-water supply device, wherein the electricity storage device converts AC power supplied from the commercial power system into DC power to store the DC power and also convert the stored DC power into AC power to supply the AC power, and the control device performs a control operation in such a manner that the amount of power to be generated by the solar light power generation device on the next day and a power demand of other electric devices than the heat pump hot-water supply device are estimated and also a power surplus obtained by subtracting the power demand from the amount of power to be generated is compared with the amount of power required of the heat pump hot-water supply device on the next day, and thus an amount corresponding to a deficit in the amount of power required which cannot be supplemented by the power surplus is stored in the electricity storage device during the nighttime of a current day, or the heat pump hot-water supply device is operated in the nighttime of the current day to generate as much power as the deficit in the amount of power required.

With such configuration, because the nighttime electricity rate is typically lower than the daytime electricity rate by the electricity rate structure of the commercial power system, in the case where power required to operate the heat pump hot-water supply device on a next day cannot be supplemented by the power surplus generated by the solar light power generation device of the next day, the control device may control the operation of the heat pump hot-water supply device during the daytime of the next day using power that was stored in the electricity storage device during the nighttime of the current day, or may control the operation of the heat pump hot-water supply device during the nighttime of the current day to generate as much power as the deficit in the amount of power required, thereby reducing the operating cost (electricity price) of the heat pump hot-water supply device.

In accordance with a third embodiment of the present invention, there is provided a heat pump hot-water supply system, including a heat pump hot-water supply device, a solar heat-assisted water heater, an electricity storage device, and a control device, wherein the control device estimates an amount of hot water required on a next day and an amount of hot water to be supplied from the solar heat-assisted water heater on the next day, and thus controls whether the electricity storage device is to be charged or not.

Further, the heat pump hot-water supply system may include a hot-water storage tank for storing hot water obtained by operating the heat pump hot-water supply device and hot water obtained by operating the solar heat-assisted water heater and the electricity storage device may convert AC power supplied from a commercial power system into DC power to store the DC power and also convert the stored DC power into AC power to supply the AC power. The control device may perform a control operation in such a manner that the amount of hot water required on the next day and the amount of hot water to be supplied from the solar heat-assisted water heater on the next day are estimated, and if the amount of hot water to be supplied is deficient compared to the amount of hot water required, in order to make up for a deficit in the amount of hot water, power required of the heat pump hot-water supply device is stored in the electricity storage device during a nighttime of a current day and the heat pump hot-water supply device is operated during a daytime of the next day using the power stored in the electricity storage device.

With such configuration, because the nighttime electricity rate is typically lower than the daytime electricity rate by the electricity rate structure of the commercial power system, in the case where the heat pump hot-water supply device is operated to make up for a deficit in the amount of hot water to be supplied from the solar heat-assisted water heater relative to the amount of hot water required on the next day, the heat pump hot-water supply device may be operated during the daytime of the next day using power that was stored in the electricity storage device during the nighttime of the current day, thereby reducing the operating cost (electricity price) of the heat pump hot-water supply device.

According to the present invention, the operating cost of the heat pump hot-water supply device can be reduced.

BRIEF DESCRIPTION OF THE DRAWINGS

The objects and features of the present invention will be apparent from the following description of embodiments when taken in conjunction with the accompanying drawings, in which:

FIG. 1A shows a system configuration in accordance with a first embodiment of the present invention.

DETAILED DESCRIPTION OF THE PREFERRED EMBODIMENTS

Figure 1B:
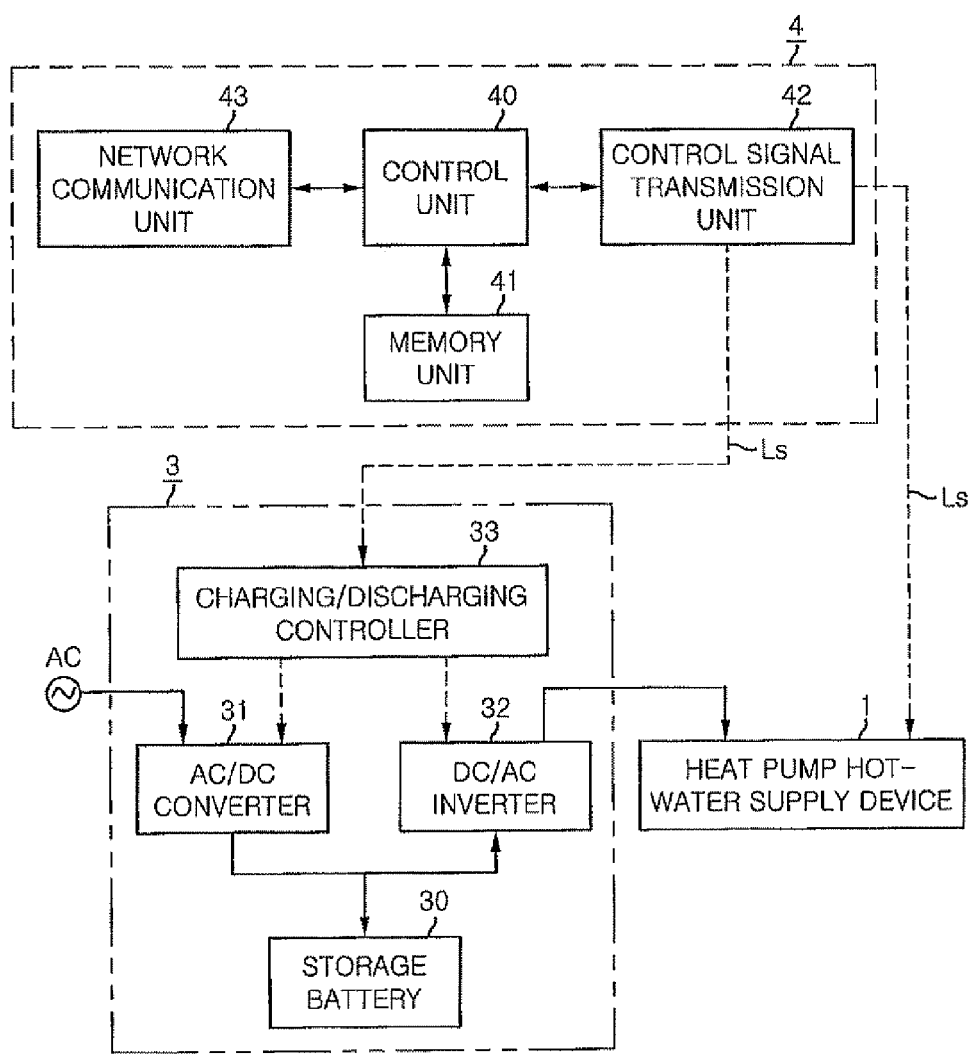
FIG. 1B shows a block diagram of a control device and an electricity storage device of the system.

Embodiments of the present invention will be described in detail below with reference to the accompanying drawings that form a part hereof. The same reference numerals will be assigned to the same or similar components throughout the drawings, and redundant descriptions thereof will be omitted.

First Embodiment

A heat pump hot-water supply system in accordance with the subject matters described in claims 1 and 2 will be described. As shown in FIG. 1A, the heat pump hot-water supply system according to the present embodiment includes a heat pump hot-water supply device 1, a hot-water storage tank 2 for storing hot water obtained by operating the heat pump hot-water supply device 1, an electricity storage device 3 for converting AC power supplied from a commercial power system AC into DC power to store the DC power and also convert the stored DC power into AC power to supply the AC power, and a control device 4 for controlling the charging/discharging of the electricity storage device 3 and also controlling the starting/stopping of the heat pump hot-water supply device 1.

The heat pump hot-water supply device 1 is conventionally known, and includes a heat pump cycle comprising an air heat exchanger for absorbing heat from the outside air (atmosphere), a compressor, a hydrothermal exchanger and expansion valves, and pumps and pipes for returning cold water supplied from the hot-water storage tank 2 back to the hot-water storage tank 2 via the hydrothermal exchanger included in the heat pump cycle. Also, the hot-water storage tank 2 is connected to a pipe for supplying water from a water service and a pipe for supplying the stored hot water into a house H. As such, in the heat pump hot-water supply device 1, when a control signal transmitted via a signal line Ls from the control device 4 as will be described later indicates to start operation of the heat pump hot-water supply device 1, the compressor and the pump are operated so that the system is put in an on-state, whereas when the control signal indicates to stop the operation of the heat pump hot-water supply device 1, the operations of the compressor and the pump are stopped so that the system is put in an off-state. Because the structures and the operations of the heat pump hot-water supply device 1 and the storage tank 2 are conventionally known, the depiction and the description thereof are omitted.

As shown in FIG. 1B, the electricity storage device 3 includes a storage battery 30 such as a lead storage battery, an AC/DC converter 31 for converting AC power supplied from a commercial power system AC into DC power which is then stored (charged) in the storage battery 30, a DC/AC inverter 32 for converting the DC power stored in the storage battery 30 into AC power which is then supplied to the heat pump hot-water supply device 1, and a charging/discharging controller 33 for controlling the operation of the AC/DC converter 31 and the DC/AC inverter 32 in response to the control signal (which will be described later) from the control device 4. Specifically, when the control signal indicates that the charging operation is to be activated, the charging/discharging controller 33 operates the AC/DC converter 31 to charge the storage battery 30, whereas when the control signal indicates that the discharging operation is to be activated, this controller operates the DC/AC inverter 32 to discharge the storage battery 30. As such, when the power conversion efficiency of the AC/DC converter 31 is $\eta 1$ and the power conversion efficiency of the DC/AC inverter 32 is $\eta 2$, the total power conversion efficiency $\eta$ of the electricity storage device 3 is defined as $\eta = \eta 1 \times \eta 2 (<1)$.

As shown in FIG. 1B, the control device 4 includes a control unit 40 the core of which is composed of a microcomputer, a memory unit 41 formed of electrically rewritable semiconductor memory (for example, flash memory) so as to store a program that can be executed by the microcomputer of the control unit 40 or a variety of data, a control signal transmission unit 42 for transmitting a control signal to the heat pump hot-water supply device 1 and the electricity storage device 3 via the signal line Ls, and a network communications unit 43 that performs network communications with the Internet 5 via a communications line Lx such as a telephone line, a CATV coaxial cable or an optical fiber cable.

The control unit 40 controls the starting/stopping of the heat pump hot-water supply device 1 in response to the control signal transmitted via the signal line Ls from the control signal transmission unit 42, and also controls the charging/discharging of the electrical storage device 3. Furthermore, instead of transmitting the control signal via the dedicated signal line Ls, the control signal transmission unit 42 may transmit the control signal via the dedicated signal line Ls. Further, for example, the control signal transmission unit 42 may transmit a control signal via a power line (not shown) arranged in a house H, using power line communications, or transmit a control signal using radio waves as a communications medium, like a low-power radio communications station.

Figure 2:
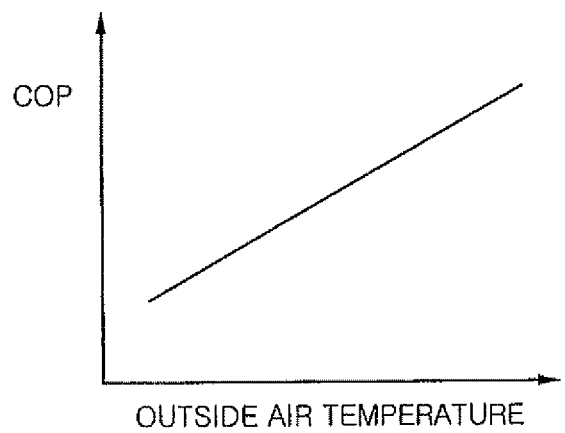
FIG. 2 shows a graph of a correlation between the outside air temperature and a coefficient of performance in the system in accordance with the first embodiment of the present invention.

The indicator that shows the performance (capability) of the heat pump hot-water supply device is exemplified by a coefficient of performance (COP). The COP refers to how much heat is required to heat water given a certain amount of power consumption when the heat pump hot-water supply device is operated. For example, the COP of the heat pump hot-water supply device that has a heating capacity of 4.5 KW at a power consumption of 1.2 KW is calculated as $4.5 \div 1.2 \approx 3.7$. This COP may vary depending on the heat value obtained from the outside air by the heat pump hot-water supply device, and the increase of the COP is proportional to the increase in the outside air temperature (FIG. 2).

The conventional system disclosed in Patent Document 1 has been proposed to reduce the operating cost (electricity price) in such a manner that power supplied from the commercial power system is stored in the electricity storage device over a time zone (e.g. the nighttime) in which the electricity rate is comparatively low, and the heat pump hot-water supply device is operated during the daytime using power stored in the electricity storage device. However, because the increase in the COP of the heat pump hot-water supply device is proportional to the increase in the outside air temperature as mentioned above, the outside air temperature of the daytime is lower than that of the nighttime of the current day in cloudy or rainy weather, undesirably lowering the COP. In the case where the COP of the nighttime on the current day is higher than the COP of the daytime on the next day, the operation of the heat pump hot-water supply device during the daytime of the next day as in the conventional system disclosed in Patent Document 1 may undesirably increase the operating cost instead.

On the assumption that the COP of the nighttime of the current day is COP1, the COP of the time zone (e.g. the daytime), wherein the temperature of the next day is predicted to be at a maximum, is COP2, and the amount of power supplied from the commercial power system AC is W, the heating capacity of the heat pump hot-water supply device 1 is W×COP1 upon direct operation of the heat pump hot-water supply device 1 during the nighttime of the current day using AC power W supplied from the commercial power system AC, and is W×η×COP2 upon storing the AC power W supplied from the commercial power system AC in the electricity storage device 3 during the nighttime of the current day and also upon operating the heat pump hot-water supply device 1 using the AC power supplied (discharged) from the electricity storage device 3 over the time span, wherein the temperature of the next day is predicted to be at a maximum. Thus, in order to reduce the operating cost in the latter case with respect to in the former case, the following inequality should be satisfied.

$$W \times \eta \times COP2 > W \times COP1$$

This inequality is changed to that below.

$$COP1/COP2 < \eta \quad \text{(Inequality 1)}$$

Specifically, in the case where the COP ratio (COP1/COP2) obtained by dividing the COP1 of the heat pump hot-water supply device 1 corresponding to the outside air temperature of the nighttime of the current day by the COP2 of the heat pump hot-water supply 1 corresponding to the estimated value (predicted maximum temperature) of the outside air temperature of the next day is less than the power conversion efficiency η of the electricity storage device 3, operating the heat pump hot-water supply device 1 over the time zone (e.g. the daytime), wherein the temperature of the next day is predicted to be at a maximum, with the power stored during the nighttime of the current day may reduce the operating cost. In contrast, if the COP ratio is equal to or greater than the power conversion efficiency η, the operation of the heat pump hot-water supply device 1 by directly supplying power from the commercial power system AC during the nighttime of the current day may reduce the operating cost.

Thus in the control unit 40 of the control device 4, the outside air temperature T1 of the nighttime of the current day is measured using a temperature sensor 10, or the temperature of the nighttime of the current day in a region having the heat pump hot-water supply device 1 is acquired as the outside air temperature T1 from a website which provides weather information such as weather forecasts (e.g. the website of a central meteorological agency or a local meteorological agency) via the Internet 5. Likewise, the predicted maximum temperature of the next day in the region having the heat pump hot-water supply device 1 is acquired as the outside air temperature T2 of the next day from the website. The COP1 of the nighttime of the current day and the COP2 of the time span, wherein the temperature of the next day is predicted to be at a maximum, are respectively determined from the above two outside air temperatures T1 and T2, and also the COP ratio is calculated. Depending on the comparison results of the corresponding COP ratio with the power conversion efficiency η of the electricity storage device 3, the control contents of the heat pump hot-water supply device 1 may vary, thereby reducing the operating cost (electricity price). The control unit 40 determines COP1 and COP2 from the outside air temperatures T1 and T2 based on the relationship (the primary function) of FIG. 2. As such, the relationship (the primary function) of FIG. 2 may be deduced from previous test results.

Figure 3:
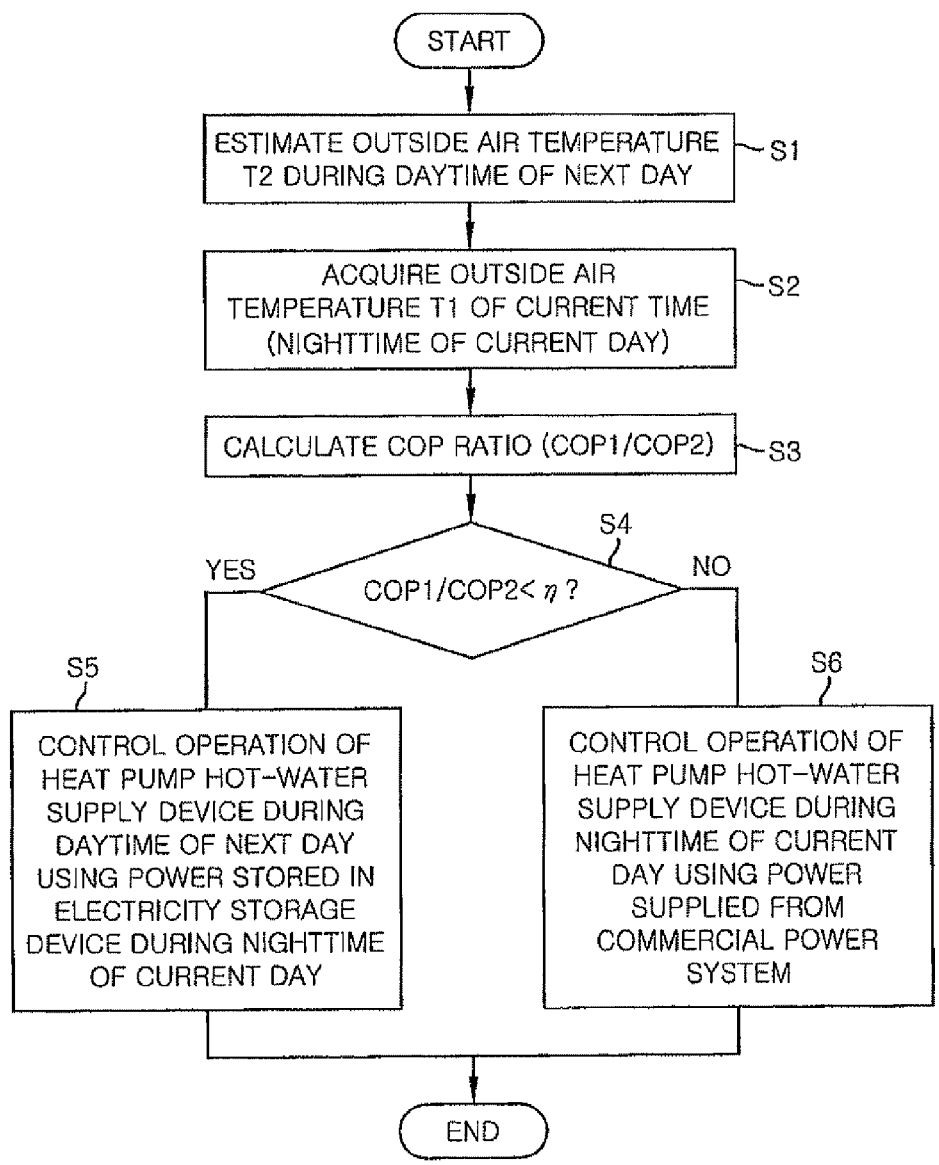
FIG. 3 shows a flowchart of an operation of the control device in the system in accordance with the first embodiment of the present invention.

With reference to the flowchart of FIG. 3, an operation of the control unit 40 of the control device 4 is described below.

For example, at a time (e.g. 11 p.m.) starting at which the electricity rate of the nighttime (midnight) is applied in accordance with the electricity rate structure of the commercial power system AC, the control unit 40 acquires the predicted maximum temperature of the next day as the outside air temperature T2 of the next day from the website (step S1), and also acquires the outside air temperature T1 of the current time (the nighttime of the current day) using the temperature sensor 10 or from the website (step S2). Furthermore, the control unit 40 determines the COP1 of the nighttime of the current day and the COP2 of the time zone (e.g. the daytime), wherein the temperature of the next day is predicted to be at a maximum, from the two outside air temperatures T1 and T2, respectively, and also calculates the COP ratio (=COP1/COP2) (step S3), and compares the corresponding COP ratio and the power conversion efficiency η of the electricity storage device 3 (step S4).

If the COP ratio is less than the power conversion efficiency (COP1/COP2<η), the control unit 40 controls the operation of the heat pump hot-water supply device 1 during the daytime of the next day using the power stored in the electricity storage device 3 during the nighttime of the current day (step S5). In contrast if the COP ratio is equal to or greater than the power conversion efficiency (COP1/COP2≥η), the control unit 40 controls the operation of the heat pump hot-water supply device 1 during the nighttime of the current day using power supplied from the commercial power system AC (step S6).

In the present embodiment as mentioned above, the control unit 40 of the control device 4 determines the charging or not of the electricity storage device 3 and also the operating time zone of the heat pump hot-water supply device 1 based on the power conversion efficiency η of the electricity storage device 3 and the COP of the heat pump hot-water supply device 1 on the current day and the next day, thereby reducing the operating cost (electricity price) of the heat pump hot-water supply device 1. In particular, in the case of the electricity rice structure wherein the nighttime electricity rate is lower than the daytime electricity rate, processing shown in the flowchart of FIG. 3 is executed by the control unit 40. Thereby, the operating cost of the heat pump hot-water supply device 1 may be further reduced taking into consideration the power conversion efficiency η of the electricity storage device 3, the COP of the heat pump hot-water supply device 1, and the electricity rate structure of the commercial power system AC.

Second Embodiment

Figure 4:
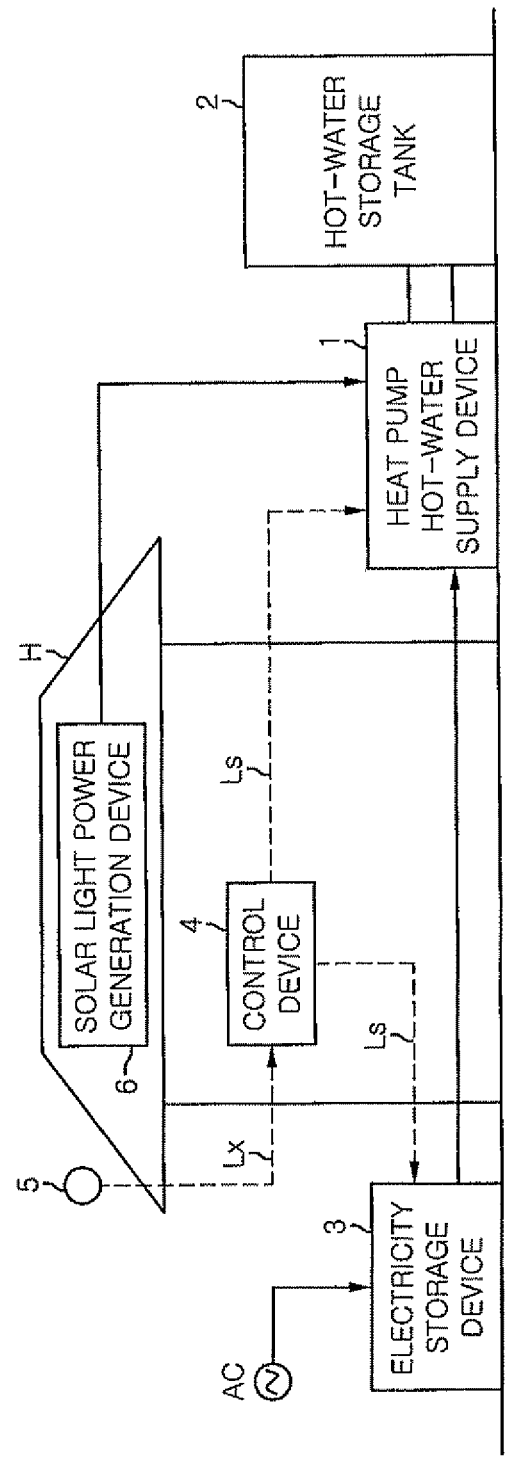
FIG. 4 shows a system according to a second embodiment of the present invention.

According to the present embodiment, a heat pump hot-water supply system, as shown in FIG. 4, is different from the first embodiment because a solar light power generation device 6 is further provided in addition to the heat pump hot-water supply device 1, the hot-water storage tank 2, the electricity storage device 3, and the control device 4. The same reference numerals are used for the same components as in the first embodiment and the depiction and description thereof are omitted.

The solar light power generation device 6 is conventionally known, and includes a solar photovoltaic cell or solar photovoltaic cells and a power conditioner. Also, power generated by the solar light power generation device 6 is supplied to the heat pump hot-water supply device 1, as well as a variety of electric devices installed in a house H, for example, a refrigerator, an air conditioner, a TV set, a washing machine, an illuminator, etc.

In consideration of the power consumption of the heat pump hot-water supply device 1 being comparatively larger than that of the other electric devices, for example, a TV set, a washing machine, an illuminator, etc., the heat pump hot-water supply system according to the present embodiment is configured such that, of the amount of power generated by the solar light power generation device 6, a power surplus which remains, and which is not supplied to the other electric devices, is supplied to the heat pump hot-water supply device 1.

However, because the amount of power generated by the solar light power generation device 6 greatly depends on the weather, it may be less than the amount of power consumed by the electric devices other than the heat pump hot-water supply device 1, in cloudy or rainy weather. As such, the heat pump hot-water supply device 1 should be operated using AC power supplied from the commercial power system AC. In order to solve this problem and reduce the operating cost of the heat pump hot-water supply device 1, the control device 4 of the present embodiment estimates both the amount of power to be generated by the solar light power generation device 6 on the next day and the power demand of the other electric devices on the next day, and also determines a power surplus of the next day generated by the solar light power generation device 6 from the above estimated values and thus controls the electricity storage device 3 and the heat pump hot-water supply device 1 depending on the presence or absence of the related surplus.

The amount of power to be generated by the solar light power generation device 6 on the next day may be estimated based on the predicted maximum temperature or predicted solar radiation of the next day acquired from a website which provides weather information such as weather forecasts (for example, the website of a central meteorological agency or a local meteorological agency) via the Internet 5. Also, the power demand of the next day may be estimated based on history information such as past power consumption history and the past weather.

Figure 5:
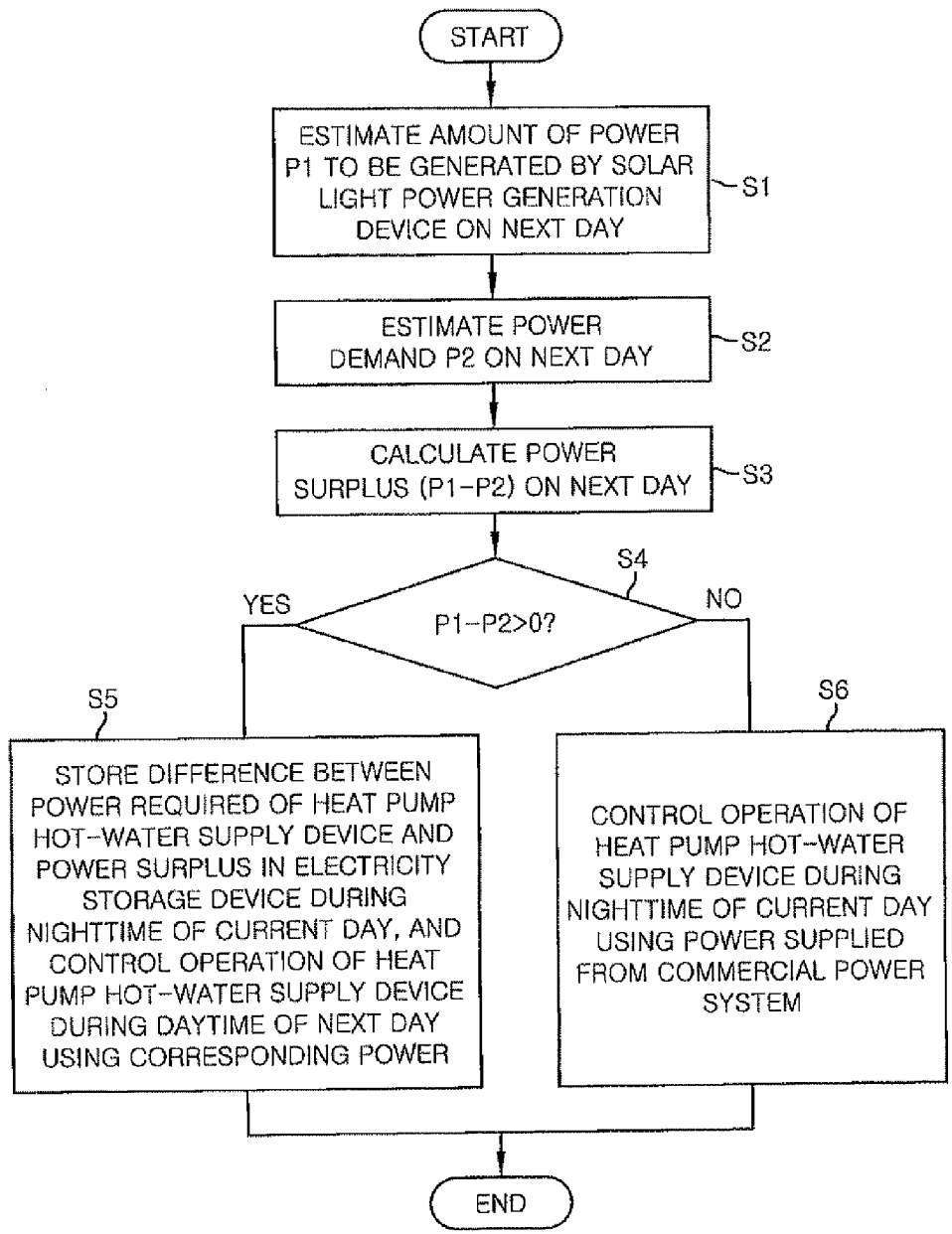
FIG. 5 shows a flowchart of an operation of a control device in the system in accordance with the second embodiment of the present invention.

With reference to the flowchart of FIG. 5, an operation of the control unit 40 of the control device 4 is described below.

For example, before the time (e.g. 11 p.m.) starting at which the electricity rate of the nighttime (midnight) is applied in accordance with the electricity rate structure of the commercial power system AC, the control unit 40 estimates the amount of power P1 to be generated by the solar light power generation device 6 on the next day based on the predicted maximum temperature and predicted solar radiation of the next day acquired from the website (step S1), and also estimates the power demand P2 of the electric devices other than the heat pump hot-water supply device 1 (step S2). Furthermore, the control unit 40 calculates the power surplus (=P1−P2) of the next day by subtracting the power demand P2 of the next day from the estimated amount of power P1 to be generated on the next day (step S3), and determines whether the corresponding power surplus is 0, that is, whether the power surplus is present or not (step S4).

If it is determined that there will be a power surplus on the next day, the control unit 40 estimates the heat demand Q of the next day and the COP of the heat pump hot-water supply device 1 and calculates the difference between the power (=Q/COP) required of the heat pump hot-water supply device 1 and the power surplus, and also stores the corresponding difference into the electricity storage device 3 using the commercial power system AC during the nighttime of the current day and controls the operation of the heat pump hot-water supply device 1 during the daytime of the next day using the power and the power surplus stored in the electricity storage device 3 (step S5). Alternatively, the control unit 40 may control the directly operating the heat pump hot-water supply device 1 during the nighttime of the current day using the commercial power system AC equal to the difference of the power surplus. On the other hand, if it is determined that there will be no power surplus on the next day, the control unit 40 controls the operation of the heat pump hot-water supply device 1 during the nighttime of the current day using the power supplied from the commercial power system AC (step S6). Alternatively, the control unit 40 may store the power required of the heat pump hot-water supply device 1 during the nighttime of the current day in the electricity storage device 3 using the commercial power system AC and may control the operation of the heat pump hot-water supply device 1 during the daytime of the next day using the power stored in the electricity storage device 3. Moreover, the heat demand Q of the next day may be estimated on the basis of history information such as past heat consumption history and the past weather.

In the present embodiment as mentioned above, the control unit 40 of the control device 4 estimates the amount of power to be generated by the solar light power generation device 6 on the next day and the power demand of the electric devices other than the heat pump hot-water supply device 1. Also, the power surplus obtained by subtracting the power demand from the amount of power to be generated is compared with the amount of power required of the heat pump hot-water supply device 1 on the next day. Thus, the control unit performs the control operation in such a manner that the amount corresponding to the deficit in the amount of power required, which cannot be supplemented by the above power surplus, is stored in the electricity storage device 3 during the nighttime of the current day, so that on the next day the heat pump hot-water supply device 1 is operated using the stored power, or the heat pump hot-water supply device 1 is operated during the nighttime of the current day to generate as much power as the deficit in the amount of power required. Thereby, the heat pump hot-water supply device 1 is operated using the AC power supplied from the commercial power system AC during the nighttime in which the electricity rate is low, ultimately reducing the operating cost (electricity price) the heat pump hot-water supply device.

Third Embodiment

Figure 6:
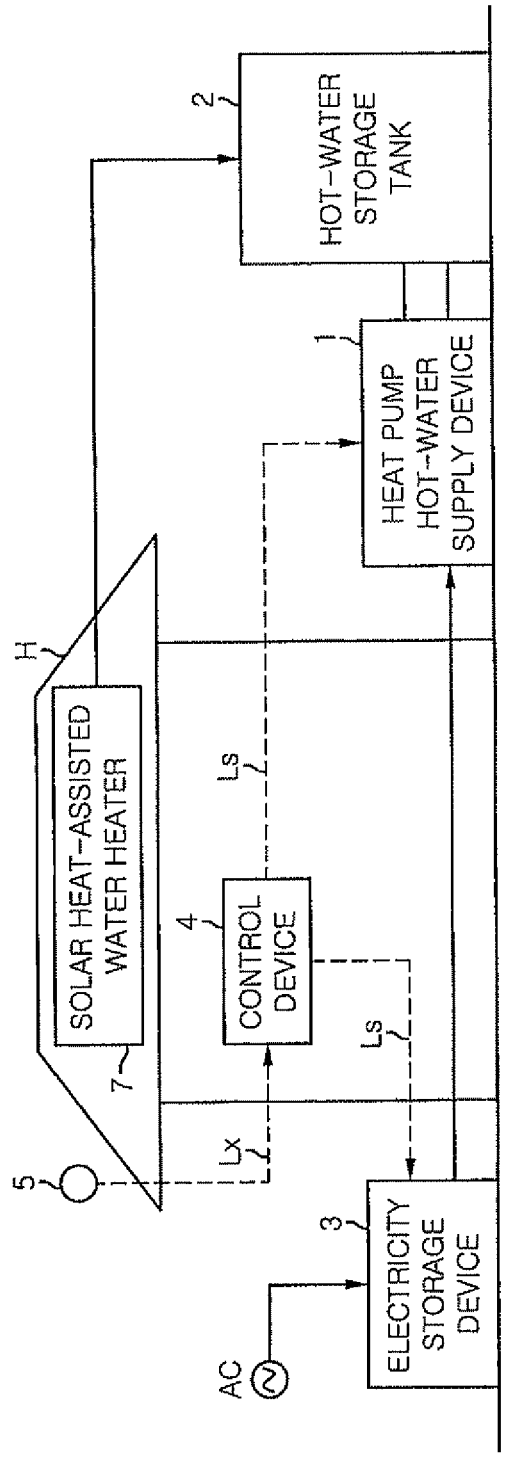
FIG. 6 shows a system in accordance with a third embodiment of the present invention.

According to the present embodiment, a heat pump hot-water supply system as shown in FIG. 6 is different from the first embodiment because a solar light-assisted water heater 7 is further provided in addition to the heat pump hot-water supply device 1, the hot-water storage tank 2, the electricity storage device 3, and the control device 4. The same reference numerals are used for the same components as in the first embodiment and the depiction and description thereof are omitted.

The solar heat-assisted water heater (hereinafter referred to as a water heater) 7 is conventionally known, but in the present embodiment is configured such that hot water heated by solar heat is stored in the hot-water storage tank 2.

The amount of hot water obtained by the water heater 7 greatly depends on the weather. During the daytime in cloudy or rainy weather, there is a deficient amount of hot water from the water heater 7 relative to the demand of hot water (heat demand), and such a deficit should be supplemented by the amount of hot water supplied from the heat pump hot-water supply device 1. As such, in the case of the electricity rate structure wherein the daytime electricity rate is higher than the nighttime electricity rate, when the heat pump hot-water supply device 1 is operated using the power generated during the daytime when the electricity rate is high, the operating cost may increase. On the other hand, if the heat pump hot-water supply device 1 is operated using the power generated during the nighttime in which the electricity rate is low to obtain hot water required on the next day, the temperature of hot water supplied from the hot-water storage tank 2 during the daytime of the next day may undesirably decrease.

In order to solve this problem and reduce the operating cost of the heat pump hot-water supply device 1, the control device 4 of the present embodiment estimates the amount of hot water required on the next day and the amount of water to be supplied from the water heater 7 on the next day. Also the control device executes the control operation in such a manner that, if the amount of hot water to be supplied falls short of the amount of hot water required, in order to make up for the deficit in the amount of hot water, the power required of the heat pump hot-water supply device 1 is stored in the electricity storage device 3 during the nighttime of the current day, and also the heat pump hot-water supply device 1 is operated during the daytime of the next day using the power stored in the electricity storage device 3.

Herein, the amount of hot water to be supplied from the water heater 7 on the next day may be estimated on the basis of the weather (weather forecasting) or the predicted temperature of the next day acquired from a website which provides weather information such as weather forecasts (for example, the website of a central meteorological agency or a local meteorological agency) via the Internet 5. Also, the amount of hot water (heat demand) required on the next day may be estimated based on the history information such as past power consumption history and the past weather.

Figure 7:
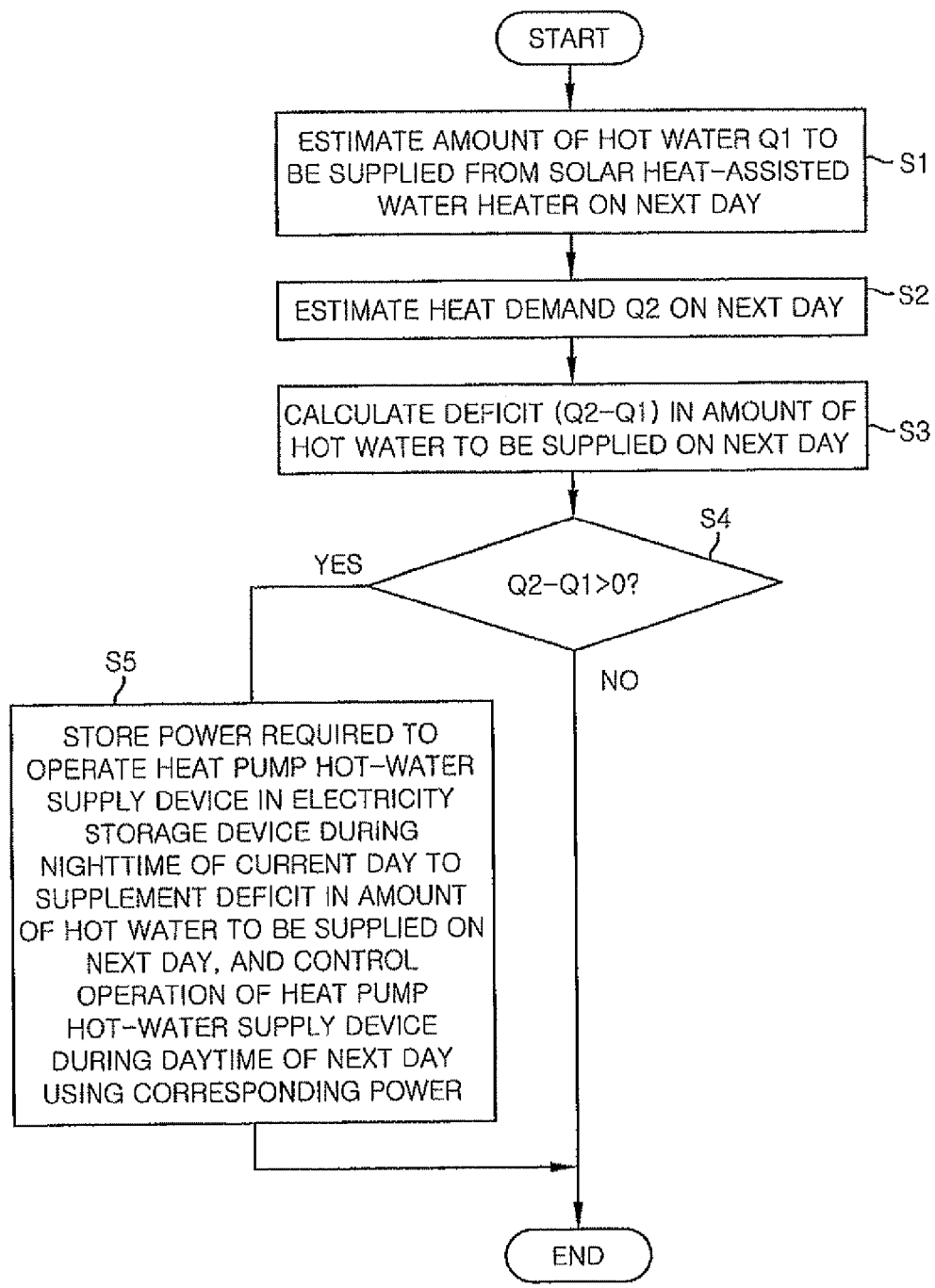
FIG. 7 shows a flowchart of an operation of a control device in the system in accordance with the third embodiment of the present invention.

With reference to the flowchart of FIG. 7, an operation of the control unit 40 of the control device 4 is described below.

For example, before the time (e.g. 11 p.m.) starting at which the electricity rate of the nighttime (midnight) is applied in accordance with the electricity rate structure of the commercial power system AC, the control unit 40 estimates the amount of hot water Q1 to be supplied from the water heater 7 on the next day based on the weather and the predicted maximum temperature of the next day acquired from the website (step S1), and also estimates the amount of hot water (heat demand) Q2 required on the next day for a house H (step S2). Also, the control unit 40 subtracts the amount of hot water Q1 to be supplied on the next day from the estimated heat demand Q2 of the next day and thus calculates a deficit in the amount of hot water to be supplied on the next day (=Q2−Q1) (step S3), and determines whether the corresponding deficit is 0 or not, namely, whether the amount of hot water to be supplied relative to the heat demand is deficient or not (step S4).

If it is determined that the amount of hot water to be supplied on the next day is deficient, the control unit 40 estimates the COP of the heat pump hot-water supply device 1 of the next day and calculates the power (=(Q2−Q1)/COP) required of the heat pump hot-water supply device 1 to supplement the deficit in the amount of hot water to be supplied, and also stores the corresponding required power in the electricity storage device 3 during the nighttime of the current day and controls the operation of the heat pump hot-water supply device 1 during the daytime of the next day using the power stored in the electricity storage device 3 (step S5). On the other hand, if it is determined that the amount of hot water to be supplied on the next day is sufficient, the control unit 40 does not charge the electricity storage device 3 but terminates the control processing.

In the present embodiment as mentioned above, the control unit 40 of the control device 4 estimates the amount of hot water required on the next day and the amount of hot water to be supplied from the water heater 7 on the next day. Also, in the case where the amount of hot water to be supplied is less than the amount of hot water required, the control device executes the control operation in such a manner that the power required of the heat pump hot-water supply device 1 is stored in the electricity storage device 3 during the nighttime of the current day to supplement the deficit in the amount of hot water to be supplied, and also the heat pump hot-water supply device 1 is operated during the daytime of the next day using the power stored in the electricity storage device 3. Thus, because the nighttime electricity rate is lower than the daytime electricity rate in accordance with the electricity rate structure of the commercial power system AC, when the heat pump hot-water supply device 1 is operated to supplement the deficit in the amount of hot water supplied from the water heater 7 relative to the amount of hot water required on the next day, the heat pump hot-water supply device 1 is operated during the daytime of the next day using the power stored in the electricity storage device 3 during the nighttime of the current day, thereby reducing the operating cost (electricity price) of the heat pump hot-water supply device 1.

As described hereinbefore, the above three embodiments of the present invention each take a different approach to reducing the operating cost of the heat pump hot-water supply device 1 but they may be provided in a combined form. For example, when a combination of the first and second embodiments is applied, in a house equipped with the solar light power generation device 6 according to the second embodiment, the estimated amount of power to be generated by the solar light power generation device 6 on the next day and the amount of power required on the next day are compared with each other. The amount corresponding to the deficit in the amount of power required that cannot be supplemented by the power surplus is stored in the electricity storage device 3 during the nighttime of the current day, or the heat pump hot-water supply device 1 is operated during the nighttime of the current day to generate as much power as such a deficit. As such, to an extent depending on the power conversion efficiency of the electricity storage device 3, the COP values of the heat pump hot-water supply device 1 of the current day and the next day and the electricity rate structure of the commercial power system AC together as in the first embodiment, the operating costs are calculated for cases in which the power is stored in the electricity storage device 3 during the nighttime of the current day and the heat pump hot-water supply device 1 is operated during the nighttime of the current day, and the operating time zone of the heat pump hot-water supply device may be determined so that the operating cost is further reduced. Likewise, the combinations of the first and third embodiments, the second and third embodiments, or the first, second and third embodiments are possible.

In the above embodiments, the example given of the place to which the heat pump hot-water supply system is applied is a house, but the present invention is not limited thereto, and may include a complex house such as a mansion, an office, a business section, etc.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A heat pump hot-water supply system, comprising a heat pump hot-water supply device, an electricity storage device, and a control device, wherein the control device determines an operating time zone of the heat pump hot-water supply device based on power conversion efficiency of the electricity storage device, coefficients of performance of the heat pump hot-water supply device of a current day and a next day, and an electricity rate structure of a commercial power system, further comprising a hot-water storage tank for storing hot water obtained by operating the heat pump hot-water supply device, wherein the electricity storage device converts an AC power supplied from the commercial power system into a DC power to store the DC power and also converts the stored DC power into an AC power to supply the AC power, and the control device further determines whether the electricity storage device is to be charged or not based on the power conversion efficiency of the electricity storage device, the coefficients of performance of the heat pump hot-water supply device of the current day and the next day, and the electricity rate structure of the commercial power system, wherein the control device is configured to compare a ratio of coefficients of performance with the power conversion efficiency of the electricity storage device, in accordance with the electricity rate structure wherein a nighttime electricity rate is lower than a daytime electricity rate, wherein the ratio of coefficients of performance is obtained by dividing a coefficient of performance of the heat pump hot-water supply device corresponding to an outside air temperature of the nighttime of the current day by a coefficient of performance of the heat pump hot-water supply device corresponding to an estimated value of an outside air temperature of the daytime of the next day, and wherein the control device either operates the heat pump hot-water supply device in the daytime of the next day by using power stored in the electricity storage device in the nighttime of the current day if the ratio of coefficients of performance is less than the power conversion efficiency or operates the heat pump hot-water supply device in the nighttime of the current day by using power supplied from the commercial power system if the ratio of coefficients of performance is equal to or greater than the power conversion efficiency.

2. The heat pump hot-water supply system of claim 1, further comprising a solar light power generation device for generating power by using solar light, wherein the control device is configured to estimate an amount of power to be generated by the solar light power generation device on the next day, an amount of power required for the heat pump hot-water supply device on the next day and a power demand of other electric devices than the heat pump hot-water supply device, wherein the control device is configured to compare the estimated amount of power to be generated by the solar light power generation device on the next day with the estimated amount of power required for the heat pump hot-water supply device on the next day, and control operation of the heat pump hot-water supply device by using power supplied from the commercial power system in a nighttime of the current day, wherein the heat pump hot-water supply system further comprises a hot-water storage tank for storing hot water obtained by operating the heat pump hot-water supply device, and wherein the electricity storage device converts an AC power supplied from the commercial power system into a DC power to store the DC power and also converts the stored DC power into an AC power to supply the AC power, and the control device is configured to compare a power surplus, which is obtained by subtracting the power demand from the estimated amount of power to be generated, with the estimated amount of power required for the heat pump hot-water supply device on the next day, and also determine, based on the power conversion efficiency of the electricity storage device and the water supply device of the current day and the next day, whether an amount corresponding to a deficit in the estimated amount of the required power which cannot be supplemented by the power surplus is stored in the electricity storage device during the nighttime of the current day or the heat pump hot-water supply device is operated in the nighttime of the current day.

3. The heat pump hot-water supply system of claim 1, further comprising a solar heat-assisted water heater, wherein the control device is configured to estimate an amount of hot water required on the next day and an amount of hot water to be supplied from the solar heat-assisted water heater on the next day, and control whether the electricity storage device is to be charged or not, wherein the heat pump hot-water supply system further comprises a hot-water storage tank for storing hot water obtained by operating the heat pump hot-water supply device and hot water obtained by operating the solar heat-assisted water heater, wherein the electricity storage device converts an AC power supplied from a commercial power system into a DC power to store the DC power and also converts the stored DC power into an AC power to supply the AC power, and the control device is configured to estimate the amount of hot water required on the next day and the amount of hot water to be supplied from the solar heat-assisted water heater on the next day, and wherein, if the amount of hot water to be supplied is deficient compared to the amount of hot water required, in order to make up for a deficit in the amount of hot water, the control device determines, based on the power conversion efficiency of the electricity storage device and the coefficients of performance of the heat pump hot-water supply device of the current day and the next day, whether power required for the heat pump hot-water supply device is stored in the electricity storage device in the nighttime of the current day and the heat pump hot-water supply device is operated in the daytime of the next day by using the power stored in the electricity storage device or the heat pump hot-water supply device is operated in the nighttime of the current day.

4. The heat pump hot-water supply system of claim 1, further comprising a solar light power generation device for generating power by using solar light, wherein the control device is configured to estimate an amount of power to be generated by the solar light power generation device on the next day, an amount of power required for the heat pump hot-water supply device on the next day and a power demand of other electric devices than the heat pump hot-water supply device, wherein the control device is configured to compare the estimated amount of power to be generated by the solar light power generation device on the next day with the estimated amount of power required for the heat pump hot-water supply device on the next day, and control operation of the heat pump hot-water supply device by using power supplied from the commercial power system in a nighttime of the current day, and the control device is configured to compare a power surplus, which is obtained by subtracting the power demand from the estimated amount of power to be generated, with the estimated amount of power required for the heat pump hot-water supply device on the next day, and also determine, based on the power conversion efficiency of the electricity storage device and the coefficients of performance of the heat pump hot-water supply device of the current day and the next day, whether an amount corresponding to a deficit in the estimated amount of the required power which cannot be supplemented by the power surplus is stored in the electricity storage device during the nighttime of the current day or the heat pump hot-water supply device is operated in the nighttime of the current day.

5. The heat pump hot-water supply system of claim 1, further comprising a solar heat-assisted water heater, wherein the control device is configured to estimate an amount of hot water required on the next day and an amount of hot water to be supplied from the solar heat-assisted water heater on the next day, and control whether the electricity storage device is to be charged or not,
  wherein the hot-water storage tank further stores hot water obtained by operating the solar heat-assisted water heater, and wherein, if the amount of hot water to be supplied is deficient compared to the amount of hot water required, in order to make up for a deficit in the amount of hot water, the control device determines, based on the power conversion efficiency of the electricity storage device and the coefficients of performance of the heat pump hot-water supply device of the current day and the next day, whether power required for the heat pump hot-water supply device is stored in the electricity storage device in the nighttime of the current day and the heat pump hot-water supply device is operated in the daytime of the next day by using the power stored in the electricity storage device or the heat pump hot-water supply device is operated in the nighttime of the current day.

\* \* \* \* \*